United States Patent [19]

Jones et al.

[11] 3,872,084

[45] Mar. 18, 1975

[54] PURINE NUCLEOSIDE 3,5-CYCLICPHOSPHATE COMPOUNDS

[75] Inventors: Gordon H. Jones, Cupertino; Ramachandran S. Ranganathan, San Diego; John G. Moffatt, Los Altos, all of Calif.

[73] Assignee: Syntex (U.S.A.) Inc., Palo Alto, Calif.

[22] Filed: July 11, 1973

[21] Appl. No.: 378,219

[72] Continuation-in-part of Ser. No. 294,777, Oct. 10, 1972, abandoned.

[52] U.S. Cl............................ 260/211.5 R, 424/180
[51] Int. Cl............................................ C07d 51/54
[58] Field of Search............................ 260/211.5 R

[56] References Cited
UNITED STATES PATENTS 3,712,885  1/1973   Weimann et al............ 260/211.5 R

*Primary Examiner*—Johnnie R. Brown
*Attorney, Agent, or Firm*—William B. Walker

[57] ABSTRACT

New purine nucleoside 3',5'-cyclicphosphate compounds are disclosed wherein the 5' carbon atom of the furanose sugar moiety bears one or two alkyl groups. Also disclosed are methods for the preparation of these compounds, which are useful as intracellular mediators of hormone effects. 9-(6-Deoxy-β-D-allofuranosyl)-adenine 3',5'-cyclicphosphate, 9-(6-deoxy-α-L-talofuranosyl)-adenine 3',5'-cyclicphosphate, and 5',5'-di-C-methyl-adenosine 3',5'-cyclicphosphate, are illustrated as representative of the compound class.

20 Claims, No Drawings

PURINE NUCLEOSIDE 3,5-CYCLICPHOSPHATE COMPOUNDS

This is a continuation-in-part of application Ser. No. 294,777, filed Oct. 10, 1972, and now abandoned.

The present invention relates to the chemistry of necleotides and, more particularly, is directed to new purine nucleoside cyclophosphate compounds. The present invention is further directed to methods for the preparation of these compounds, certain intermediates useful therein, and the use of the product cyclicphosphate compounds in the treatment of various metabolic disorders by intracellular mediation of hormones considered responsible for physiological responses in various tissues.

Adenosine 3',5'-cyclicphosphate (CAMP), present in almost all types of mammalian tissue and synthesized in the cell, controls some of the physiological and metabolic effects associated with the cell type and attributed to specific regulatory hormones. The sequence of events involved, seen with most of the hormones examined, namely, interaction of the primary hormone with the cell membrane resulting in increased synthesis of CAMP, which mediates the functions of the hormones, have led to the designation of CAMP as a second messenger. Evidence has accumulated to indicate that several diseases including metabolic and endocrine disorders are probably due to insufficient concentrations of CAMP in the cell. Thus, a rational approach in the treatment of such disease states depends upon elevating CAMP levels in the specific cell types afflicted. This can be achieved probably by the direct administration of CAMP. However, this approach suffers from the disadvantages of its poor permeability through the cell membrane and its apparent lack of tissue selectivity in its action.

The present invention is directed to a new series of purine nucleoside 3',5'-cyclicphosphate compounds which combine the advantage of high biological activity with increased selectivity in action to different target tissues and increased stability toward degenerative enzymes. The compounds of the present invention are represented by the following formula:

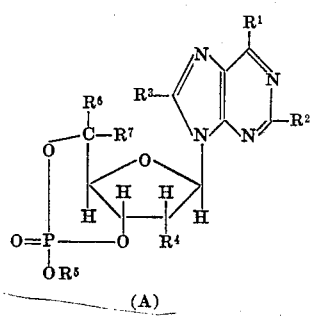

wherein
$R^1$ is chloro, amino, acylamino, alkylamino, aralkylamino, dialkylamino, diaralkylamino, sulfhydryl, alkylthio, arylthio, aralkylthio, hydroxy, alkoxy, aryloxy, or aralkoxy;
$R^2$ is hydrogen or amino;
$R^3$ is hydrogen, halo, hydroxy, alkoxy, aryloxy, aralkoxy, sulfhydryl, alkylthio, arylthio, aralkylthio, azido, amino, acylamino, alkylamino, aralkylamino, dialkylamino, or diaralkylamino;
$R^4$ is hydroxy or conventional groups convertible to hydroxy by hydrolysis;
$R^5$ is hydrogen or a pharmaceutically acceptacle cation; and
one of $R^6$ and $R^7$ is hydrogen and the other of $R^6$ and $R^7$ is a lower alkyl group or $R^6$ and $R^7$ are identical lower alkyl groups.

Particularly preferred compounds are those of Formula (A) wherein $R^1$ is amino or acylamino and each of $R^2$ and $R^3$ is hydrogen and $R^4$ is hydroxy (i.e., compounds in the adenosine series) and those thereof wherein one of $R^6$ and $R^7$ is hydrogen and the other of $R^6$ and $R^7$ is lower alkyl and those thereof wherein $R^1$ is amino and $R^5$ is hydrogen.

The compounds of the present invention are useful in the treatment of various disease states, including metabolic and endrocrine disorders, by virtue of their ability to increase the levels of intracellular mediators of hormone effect. They demonstrate high biological activity and selectivity in action to different target tissues. They also slow stability towards degenerative enzymes, i.e., cyclic phosphodiesterase. Thus, the compounds of the present invention are useful, for example, in the treatment of bronchial asthma, refractory congestive heart failure, diabetes mellitus, pseudohypoparathyroidsim, obesity, some neoplastic manifestations, vasopressin resistant diabetes insipidus, and other disorders attributable to pituitary disfunction.

The present invention, in a second aspect, is directed to pharmaceutical compositions incorporating a compound of Formula (A) hereof as an essential active component in admixture with a pharmaceutically acceptable non-toxic carrier.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liequid carriers, particularly for injectable solutions. Suitable pharmaceutical excipients include starch, cellulose, talc, glucose, lactose, sucrose, gelatin, malt, rice, flour, chalk, silica gel, magnesium stearate, sodium stearate, glycerol monostearate, sodium chloride, dried skim milk, glycerol, propylene glycol, water, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The present invention also involves a method useful for the treatment of biological disorders which comprises administering an effective amount of a compound of Formula (A) hereof.

An amount of a compound hereof effective for the treatment of biological disorders, in accordance herewith, can vary generally in the range of from about 1 mg. to about 100 mg. per kg. of host body weight administered one or more times daily. The active compound hereof can be administered in any suitable manner, parenteral or oral, and in any form suitable for the administration mode, isotonic solutions, suspensions, tablets, capsules, and the like.

The present invention, in a further aspect, is directed to methods for the preparation of the compounds (represented by Formula A) hereof and to intermediates useful therein. The compounds of the present invention can be prepared in accordance with the following reaction sequences:

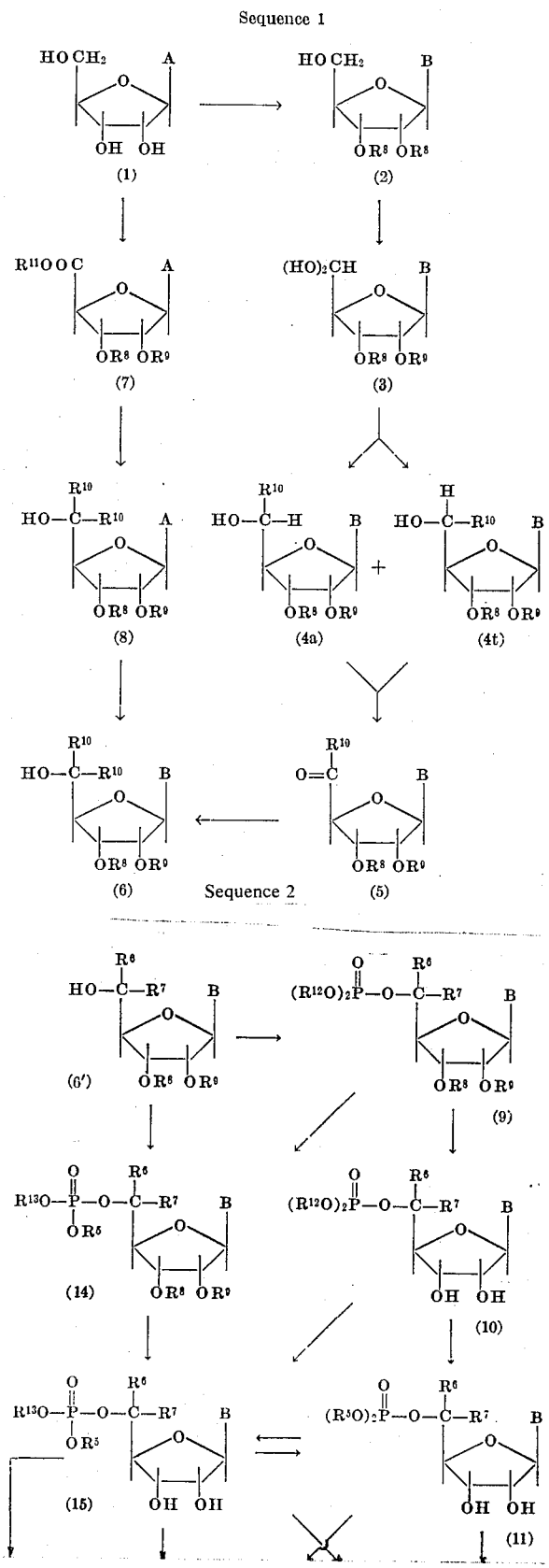

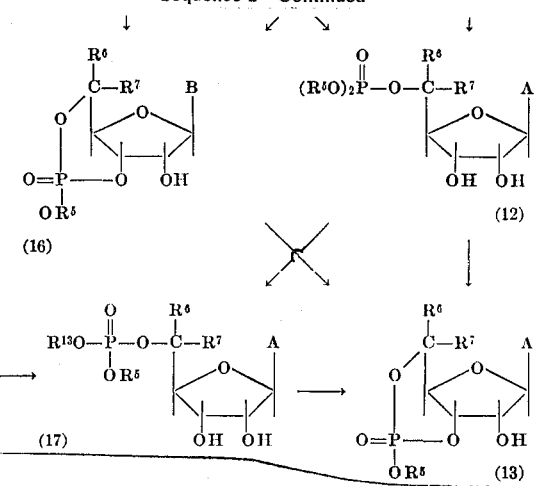

In the above depicted the reaction sequences, A is adenine, guanine or hypoxanthine; B is hypoxanthine or an acylamino protected adenine or guanine; each of $R^5$, $R^6$ and $R^7$ is as above defined; each of $R^8$ and $R^9$ is a suitable hydroxyl protecting group, e.g., benzoyl, or $R^8$ and $R^9$ when taken together are an acetal protecting group, e.g., isopropylidene, each $R^{10}$ is lower alkyl; $R^{11}$ is lower alkyl; preferably methyl; $R^{12}$ is the ester moiety of a known phosphorylating agent such as described by Veda and Fox in Advances in Carbohydrate Chemistry, 22, 307 (1967) and $R^{13}$ is an ester moiety as defined by $R^{12}$ or is 2-cyanoethyl.

In Sequence 2, Formula (6') is meant to represent by one formula compounds of Formulas (4t), (4a), and (6). In Formulas 6', 9 thru 17, when $R^6$ is lower alkyl and $R^7$ is hydrogen, the compounds have the $\beta$-D-allo configuration in the sugar ring; when $R^7$ is lower alkyl and $R^6$ is hydrogen, the compounds have the $\alpha$-L-talo configuration; and when $R^6$ and $R^7$ are the same lower alkyl, the compounds have the $\beta$-D-ribo configuration.

With reference to the above reaction sequence, adenosine, guanosine or inosine is protected via reactions known to those skilled in the art. For example, the 2',3'-O-isopropylidene group is introduced by treatment of the 2',3'-diol with acetone in the presence of perchloric acid. The N-acyl derivatives in the adenosine and guanosine series are prepared by first blocking the 5'-hydroxyl group of the 2',3'-O-isopropylidene nucleoside in the form of its monomethoxytrityl ether followed by acylation of the amino group with the appropriate acid anhydride or acyl chloride. The trityl ether is then selectively removed by treatment with 80 percent acetic acid at room temperature.

The compounds of Formula (2) thus prepared are reacted with dicyclohexylcarbodiimide in dimethylsulfoxide solution in the presence of a suitable acid catalyst thereby giving the corresponding 5'-aldehyde derivatives, according to the procedure of U.S. Pat. No. 3,248,380. This reaction is conducted at temperatures ranging from about 0° to 50°C, preferably 20 to 30°, for 2 to 24 hours, preferably 6 to 16 hours, using 3 to 5 moles of carbodiimide and 0.5 to 1.0 moles of acid per mole of starting substrate (2). Suitable acids include dichloroacetic acid, phosphoric acid, and pyridinium trifluoroacetate. Other carbodiimides may also be used with advantage in this reaction e.g. di-n-propylcarbodiimide and the like. In addition, inert organic solvents, e.g., benzene and ethyl acetate, may also be added. Although the crude aldehyde derivatives, thus produced, may be used in the subsequent steps, it is advantageous to effect a purification of these compounds. This can be conveniently accomplished by the addition of N,N'-diphenylethylenediamine to the above reaction mixture when analysis by thin layer chromatography or high voltage paper electrophoresis indicates the oxidation reaction is complete. The formation of the imidazolidine derivative proceeds with the addition of about 1 to 3 moles of N,N'-diphenylethylenediamine followed by a reaction period of from about 1 to about 16 hours. Preferably, this reaction is monitored by thin layer chromatography and when complete the product can be isolated by conventional techniques, e.g., crystallization.

The resultant imidazolidine compound is reacted with a strong acid to regenerate the 5'-aldehyde hydrate compound (3). This reaction can be carried out in a mixture of inert solvents, e.g., acetone, ethylacetate, methylene chloride, using p-toluenesulfonic acid or preferably can be accomplished by treating the imidazolidine derivative in aqueous tetrahydrofuran with excess Dowex 50 (H+) (Dowex 50 is a trade name for a sulfonated polystyrene resin 8% crosslinked with divinylbenzene) at a temperature ranging from about 20° to about 60°C for a period of time ranging from about 30 minutes to about 6 hours.

As part of the principal reactions hereof, the thusprepared aldehyde compound (3) is reacted with alkyl magnesium halide, preferably chloride, to give the 5'-alkylated products 4a and 4t. This reaction is conducted at temperatures ranging from about −10° to about 35°C and for a period of time ranging from about 5 minutes to about 60 minutes, preferably employing from about 5 to about 10 moles of alkyl magnesium chloride per mole of starting substrate. This reaction provides a mixture of products, the β-D-allo compound and the α-L-talo compound of the respective formulas (4a and 4t). These respective compounds can be separated and isolated, if desired, by means of conventional techniques, e.g., column chromatography and fractional crystallization.

The resulting compound 4 is oxidized to the keto compound 5 by reaction with a carbodiimide in dimethylsulfoxide in the presence of a suitable acid catalyst. The reaction is conducted at temperatures ranging from about 0° to about 50°C and for a period of time ranging from about 2 to about 24 hours, preferably employing from about 3 to about 5 moles of the carbodiimide, preferably dicyclohexylcarbodiimide, and from about 0.5 to 1.0 mole of acid, preferably dichloroacetic acid or pyridinium trifluoroacetate, per mole of starting substrate 4a or 4t or a mixture thereof.

The resultant ketone (5) is then reached with the same alkyl magnesium halide, as described above, to give the di-C-substituted derivatives of formula (6) (each $R^{10}$ is the same alkyl). Alternatively, the compounds of formula (6) are prepared by reaction of alkyl magnesium halide with the nucleoside uronate esters of formula (7), as described above (3 → 4a and 4t) thereby giving the di-C-alkylated compounds of formula (8). The N-acyl protecting groups, used in the adenine and guanine series, are added by reacting compounds of formula (8) with an acid anhydride or an acyl chloride in pyridine, as described herein, thereby giving compounds of formula (6). The starting materials for this alternative synthesis are prepared from adenosine, guanosine or inosine via protection of the 2',3'-hydroxyls with isopropylidene, as described above, oxidation of the 5'-hydroxyl group to a carboxyl group using potassium permanganate, by the general procedure of Schmidt et al., Chem. Ber. 101, 590 (1968), followed by conversion of the carboxyl group to a carboalkoxy group, preferably carbomethoxy in which instance diazomethane is the reagent of choice.

The compounds represented by Formulas (4a), (4t), and (6), as represented collectively by Formula (6') in Sequence 2, are then phosphorylated to produce the compounds of Formula (9). In this phosphorylation reaction, the respective substrate compounds are treated with, for example, bis- 2,2,2-trichloroethylphosphorochloridate, tetra-p-nitrophenylpyrosphosphate, or other known phosphorylating agents in a suitable organic solvent, e.g., pyridine or pyridine/dimethylformamide, and the like. The reaction is conducted at temperatures ranging from about 0° to about 50°C and for periods of time ranging from about 2 to about 180 hours, preferably employing from about 2 to 5 moles of the phosphorylating agent per mole of the starting substrate (6').

The thus produced phosphorylated product 9 is then hydrolyzed by acid under conditions known per se, preferably 90% aqueous trifluoroacetic acid for from 15 to 60 minutes, to produce the 2,3-diol (10).

The phosphotriester (10) when $R^{12}$=2,2,2-trichloroethyl is then converted to the phosphomonoester (11) by treatment with a reducing metal in the presence of an acid in an inert organic solvent. The preferred conditions involve the addition of acetic or formic acid to a vigorously stirred mixture of zinc dust in dimethylformamide using from about 10 to 50 moles of zinc and from about 10 to 100 moles of acid per mole of starting substrate (10) at a temperature of about −10° to 20°C for a period of time from about 15 minutes to 60 minutes.

The acylamino protecting groups on the base moiety of compound (11) are then removed by treatment with ammonium hydroxide solution at a temperature from about 20° to 100°C for a period of time ranging from about 4 hours to 48 hours, thereby giving the product compounds of formula (12). The unprotected phosphomonoesters of formula (12) are then cyclized by reaction with a carbodiimide, preferably dicyclohexylcarbodiimide, in dilute solution in a basic organic solvent, preferably pyridine, at a temperature ranging from about 90° to about 120°C and for a period of time ranging from about 2 hours to about 6 hours employing from about 2 moles to about 4 moles of dicyclohexylcarbodiimide per mole of the starting substrate (12), according to the procedure of Drummond et al., J. Am. Chem. Soc. 86, 1626(1964).

Although not depicted completely in sequence 2 the sequence of reactions 9 → 10 → 11 → 12 → 13 can be rearranged in any order such that compound (9) is the starting substrate, compound (13) the final product and the cyclization reaction is performed after removal of the 2'3'-protection group. For example, compound (9) is first treated with zinc dust and acetic acid in dimethylformamide, the 2'3'-protecting group is removed by aqueous acidic treatment, and the product thereof cyclized to give the cyclic phosphate (16). Removal of the acylamino group on the base moiety then gives (13) In addition, compounds of formulae (9) and (10) wherein $R^{12}$ is p-nitrophenyl, are converted respectively to compounds (14) and (15) by treatment with a 0.05 molar to 0.2 molar aqueous solution of an alkali metal hydroxide, preferably lithium hydroxide, for a period from about 15 minutes to about 2 hours at a temperature from about 0° to about 40°C.

Alternatively, the compounds represented by formula (6') are phosphorylated using an alternate phosphorylating agent, such as 2-cyanoethylphosphate, p-nitrophenylphosphate, S-ethylphosphorothioate and the like, in conjunction with a condensing agent such as dicyclohexylcarbodiimide, 2,4,6-triisopropylbenzenesulfonyl chloride and the like, in a suitable organic reaction medium such as pyridine or dimethylformamide and the like, to prepare the respective products represented by formula (14). The compounds of formula (14), thus prepared, are then hydrolyzed, as described above, to remove the protecting groups at the 2',3' positions thus giving (15), as alternatively prepared via the sequence 6' → 9 → 10 → 15, as described above. Treatment of compounds of formula (15) wherein $R^{13}$=p-nitrophenyl with ammonium hydroxide solution as described above for step 11 → 12, leads to the unprotected phosphodiester (17). Compounds (15) and (17) wherein $R^{13}$=p-nitrophenyl can also be prepared from compounds (11) and (12), respectively, by treatment of the latter with p-nitrophenol in the presence of a suitable condensing agent e.g. dicyclohexylcarbodiimide or 2,4, 6-tri-isopropylbenzenesulfonyl chloride in a suitable organic solvent, e.g., pyridine or dimethylformamide, as described by Borden and Smith, J. Org. Chem. 31, 3241 (1966).

Treatment of the compounds of formula (15), wherein $R^{13}$ is 2-cyanoethyl, with ammonium hydroxide, as described above, gives the compounds of formula (12) which are then cyclized, as described, to give the compounds of formula (13). In the conversion of 15 → 12, both the acylamino group on the base moiety and the 2-cyanoethyl group on the phosphoryl moiety are hydrolyzed. With proper control, i.e., the use of about 0.1N sodium hydroxide, of the reaction conditions it is also possible to convert compounds (15) to compounds (11). The compounds of formulas (15) and (17), wherein $R^{13}$ is p-nitrophenyl, are cyclized to the compounds of Formula (16) and (13), respectively, by treatment with a strong organic base in a suitable organic solvent, see Borden and Smith, J. Org. Chem. 31, 3247 (1966). Typically such reactions are conducted using from about 10 moles to 100 moles of base, preferably potassium t-butoxide, per mole of starting substrate in a dipolar aprotic solvent, preferably dimethylformamide or dimethylsulfoxide, at a temperature from about 0°C to 20°C for a period of time ranging from about 10 to 60 minutes. The compounds of formula (16) are then converted to the compounds of formula (13) by treatment with ammonium hydroxide solution, as described above for the conversion of compounds 11 → 12.

The products represented by Formula (13) are converted to the products of Formula (A), containing the optional, additional substituents represented by groups $R^1$, $R^2$, $R^3$, and $R^4$, by methods known generally in the art. Thus, reaction of the compounds of Formula (13) with bromine in aqueous sodium acetate buffer pH 3.9, as described by Muneyama et al., Biochemistry, 10, 2390 (1971), gives the corresponding 8-bromo compounds of the following Formula (18) which are isolated by conventional techniques such as crystallization or ion exchange chromatography or diethylaminoethyl-sephadex (DEAE-sephadex):

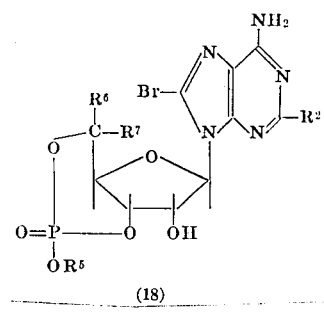

(18)

wherein each of $R^2$, $R^5$, $R^6$, and $R^7$ is as above defined. Other $R^3$ substituents are introduced via nucleophilic substitution reactions using various nucleophiles and the compounds of Formula (18). For example, reaction of (18) with alkylthiols and arylthiols, aralkylthiols in the presence of sodium methoxide leads to the 8-alkylthio and 8-arylthio, 8-aralkylthio compounds respectively of Formula (A); reaction of (18) with sodium hydroxide or with sodium alkoxides or with sodium aryl(alkyl)oxides gives the 8-hydroxy and the 8-alkoxy and the 8-aryl(alkyl)oxides compounds respectively of formula (A); reaction of (18) with thiourea gives the 8-sulfhydryl compounds of formula (A); reaction of (18) with alkylamines, dialkylamines, aralkylamines and diaralkylamines gives the 8-alkylamino, 8-dialkylamino, 8-aralkylamino and 8-diaralkylamino compounds, respectively, of formula (A); reaction of 8-bromo (18) with azide ion gives the 8-azide compounds of formula (A) which are reduced catalytically to the 8-amino compounds of formula (A) which can be converted to the 8-acylamino compounds of formula (A) by reaction with an acyl chloride or an acid anhydride as described elsewhere. The 8-chloro and the 8-iodocompounds of formula (A) are prepared from the 8-methylthio or the 8-thio compounds by reaction with chlorine and hydrochloric acid at −10 to −20°C or with iodine and sodium iodide, see Gersen et al., J. Org. Chem. 28,945 (1963). The 8-fluoro compounds of formula (A) are prepared via diazotisation of the 8-amino compounds of formula (A), in the presence of fluoroboric acid followed by either irradiation with ultra violet light or heating of the intermediate diazonium tetrafluoroborate.

The groups represented by $R^1$ are also introduced by reactions known generally in the art. Thus, reaction of the compounds of formula (A), wherein $R^1$ is hydroxy, $R^2$ is hydrogen or amino, $R^4$ is acetyl and each of $R^3$, $R^5$, $R^6$ and $R^7$ is as previously defined, with thionyl chloride in pyridine in the presence of N,N'-dimethylaniline at a temperature ranging from about 70° to about 120°C gives the corresponding compounds of formula (A) wherein $R^1$ is chloro. Alternatively, treating the chloro substrate with ammonia affords the corresponding compounds of Formula (A) wherein $R^1$ is amino which can be converted to acylamino, as described above. This reaction is known to those skilled in the art, see for example the conversion of inosine 3',5'-cyclic phosphate to 6-chloro β-D-ribofuranosylpurine 3',5'-cyclic phosphate described by L. N. Simon et al., Biochemistry 11, 2704 (1972). Although these intermediate compounds of Formula (A) wherein $R^1$ is chloro may be isolated, if desired, it is usually more convenient to treat them in situ with the appropriate nucleophilic reagent thereby giving the desired elaborated compounds of Formula (A). For example, reaction of the compounds of Formula (A) wherein $R^1$ is chloro with sodium hydrosulfide gives the 6-sulfhydryl compounds of Formula (A) which are then converted to the 6-alkylthio or 6-arylthio, 6-aralkylthio compounds by reaction with the appropriate alkyl halide or aryl halide or aralkyl halide respectively; reaction of the compounds of Formula (A) wherein $R^1$ is chloro with the alkylamines, dialkylamines, aralkylamines and diaralkylamines gives the corresponding 6-alkylamino, 6-dialkylamino, 6-aralkylamino and 6-diaralkylamino compounds respectively of Formula (A). The 6-oxyethers are prepared as described above with respect to C-8 elaboration.

Reaction of the compounds of Formula (A) wherein $R^1$ is amino with an acyl chloride or an acid anhydride in pyridine solution gives the 6-acylamino compounds of Formula (A). Generally, the acylation of the 6-amino function of compounds of Formula (A) requires extended reaction times (e.g. 6-7 days) relative to the reaction times (e.g. 2-24 hours) required for the acylation of the 2'-hydroxyl described below.

The elaborative groupings represented by group $R^4$ can be prepared by reacting the modified purine nucleoside-3',5'-cyclophosphates of Formula (A) wherein $R^4$ = hydroxy with the desired corresponding organic acid anhydride of a carboxylic acid having from 1 to 22 carbons in a suitable inert organic solvent such as pyridine, for example, by reacting it with acetic anhydride in pyridine or preferably with butyric anhydride in pyridine solution. Tetrahydropyran-2-yl, tetrahydrofuran-2-yl, and 4-methoxy-tetrahydropyran-4-yl ethers can be prepared by well known, conventional procedures from the corresponding respective dihydropyran, dihydrofuran, and 4-methoxy-5,6-dihydro-2H-pyran in a suitable inert organic solvent such as dimethylformamide, dioxane or tetrahydrofuran in the presence of a suitable catalyst such as p-toluenesulfonic acid.

Salts with pharmaceutically acceptable cations (when $R^5$ is a pharmaceutically acceptable cation) can be conventionally prepared by cation exchange from another salt or by neutralization with a specific base followed by precipitation.

The phrase "conventional groups convertible to hydroxy by hydrolysis" refers to conventional groups which can be hydrolyzed to hydroxy groups such as, for example, conventional hydrolyzable ester groups and hydrolyzable ether groups. The term "hydrolyzable ester groups," as used herein, refer to those esters conventionally employed in the nucleoside and nucleotide art, preferably those derived from carboxylic acids of 1 to 22 carbon atoms. Typical conventional hydrolyzable acyl groups thus include acetoxy, propionyloxy, butyryloxy, valeryloxy, isovaleryloxy, hexanoyloxy, heptanoyloxy, octanoyloxy, nonanoyloxy, undecanoyloxy, lauroyloxy, benzoyloxy, phenylacetoxy, palmitoyloxy, phenylpropionyloxy, p-tolyloxy, β-cyclopentylpropionyloxy, and the like. The term "hydrolyzable ether groups," as used herein, denotes those hydrolyzable groups conventionally employed in the nucleoside and nucleotide art including tetrahydropyran2'-yloxy, tetrahydrofuran-2'-yloxy, 4'-(lower)-alkoxytetrahydropyran-4'-yloxy groups and the like.

By the term "lower alkyl" is meant a straight or branched chain aliphatic group containing one to six carbon atoms and one and two ... and 6 carbon atoms and one to two ... to six carbon atoms, e.g., methyl, ethyl, n-propyl, isopropyl, n-butyl, secbutyl, isobutyl, t-butyl, pentyl, isopentyl, and hexyl. By the term "alkyl" in derivations thereof, i.e., alkoxy, alkylthio, alkylamino, dialkylamino, the alkyl moiety is one containing about 1 to 18 carbon atoms. By the term "aryl" in derivations thereof, such as aryloxy and arylthio, is meant an aryl group containing from 6 to 12 ring carbon atoms and is selected from phenyl, biphenyl and naphthyl (preferably β-naphthyl) and mono or poly substituted derivatives thereof wherein the substituents are selected from nitro, amino, alkyl, alkoxy, halo, and alkylthio, the latter terms as defined herein, preferably monosubstituted methyl, ethyl, propyl, butyl, methoxy, ethoxy, propoxy, butoxy, bromo, fluoro, chloro, methylthio, ethylthio, propylthio, or butylthio. By the term "aralkyl" in derivations thereof, i.e., aralkoxy, aralkylthio, aralkylamino, diaralkylamino, the aralkyl moiety is one in which the alkyl portion contains about 1 to 8 carbon atoms, preferably methyl and ethyl and the aryl ("ar") portion is as defined above. By the term "halo" is meant bromo, chloro, fluoro, and iodo. By the term "acyl" is meant an acyl group containing 1 to 22 carbon atoms and being 1) a straight or branched chain, saturated or unsaturated alkanoyl, 2) benzoyl, or 3) a substituted benzoyl group wherein the substituents are selected from alkyl, alkoxy, halo, and alkylthio, the latter terms as defined herein, preferably monosubstituted by methyl, chloro, bromo, or methoxy.

The term "pharmaceutically acceptable cations," as used herein, refers to cations to those pharmaceutically acceptable salts conventionally employed in the nucleotide and nucleoside art such as the barium, calcium, sodium, potassium, ammonium, trimethylammonium and triethylammonium salts.

In the present application, nomenclature is employed which is not in strict conformity with "The Rules of Carbohydrate Nomenclature." For example, the compound named herein as 5',5'-di-C-methyladenosine 3',5'-cyclicphosphate also may be properly referred to as 9-(6-deoxy-5-C-methyl-β-D-ribo-hexofuranosyl)-adenine 3',5'-cyclicphosphate. Likewise, the compound referred to as 9-(6-deoxy-6-C-methyl-β-D-allofuranosyl)-adenine 3',5'-cyclicphosphate also may be properly referred to as 9-(6,7-dideoxy-β-D-alloseptofuranosyl)-adenine 3',5'-cyclicphosphate.

The following examples serve to further illustrate the present invention but should not be construed as limiting scope hereof.

EXAMPLE 1

Adenosine (1 mmole) is suspended in 10 ml. of acetone containing 2 ml. of 2,2-dimethoxypropane. Perchloric acid is added thereto until dissolution and the solution is stirred for one half hour. Concentrated ammonia is added to neutralize the solution and the resultant mixture is then evaporated to dryness and the product purified by chromatography to provide the 2',-3'-O-isopropylideneadenosine which can be recrystalized from methanol.

The procedure of Example 1 is repeated utilizing inosine and guanosine in lieu of adenosine to respectively prepare 2',3'-O-isopropylidineinosine and 2',3'-O-isopropylideneguanosine.

The procedure of Example 1 is repeated utilizing benzaldehyde and its dialkyl acetal and cyclohexanone and its dialkyl acetal in lieu of acetone and 2,2-dimethoxypropane to prepare the corresponding 2',3'-O-benzylidene and 2',3'-O-cyclohexylidene-adenosine, -inosine, and -guanosine products.

EXAMPLE 2

To a solution of 2',3'-O-isopropylideneadenosine (10 mmoles) in 25 ml. of pyridine is slowly added monomethoxytrityl (12mmoles) chloride in 25 ml. of pyridine. After the addition the mixture is kept for 18 hours at 20°C and then 15 mmoles of benzoyl chloride are added. The reaction is allowed to proceed at room temperature (20°C) for 24 hours. After this time, the reaction mixture is poured over ice and the resultant mixture partitioned between ethyl acetate and water. The organic layer is separated, washed with sodium bicarbonate and water and the washed mixture then evaporated to dryness. The residue is dissolved in a minimum of ethyl acetate and precipitated with hexane. The precipitate is hydrolyzed in a mixture of dimethylformamide (50 ml.) and 50 ml. of 80% acetic acid at 20°C for one hour. The solvents are removed under vacuum and the residue purified by chromatography. The purified material is crystallized from chloroform to provide the $N^6$-benzoyl-2',3'-O-isopropylideneadenosine product.

In like manner, $N^6$-acetyl-2',3'-O-isopropylideneadenosine is prepared using acetic anhydride and each of $N^2$-benzoyl-2',3'-O-isopropylidenequanosine and $N^2$-acetyl-2',3'-O-isopropylideneguanosine are thus prepared.

EXAMPLE 3

To a stirred solution of $N^6$-benzoyl 2',3'-O-isopropylideneadenosine (36.3 g., 88 mmoles) in dimethylsulfoxide (200 ml.) is added dicyclohexylcarbodiimide (54.6 g., 264 mmoles) and dichloroacetic acid (3.52 ml., 44 mmoles). The initial exothermic reaction is controlled by cooling the mixture in an ice bath. After 90 minutes, a solution of oxalic acid (22 g., 210 mmoles) in methanol (75 ml.) is cautiously added in order to destroy the excess dicyclohexycarbodiimide. The reaction mixture is filtered after stirring for a further 30 minutes and the residual N,N'-dicyclohexylurea washed thoroughly with methanol. N,N'-Diphenylethylenediamine (22 g., 105 mmoles) is added to the clear filtrate and after fifteen minutes enough water is added to get a slightly turbid solution which is then stored overnight. The deposited crystals are collected by filtration and recrystallized from aqueous ethanol giving $N^6$-benzoyl-5'-deoxy-5'-(N,N'-diphenylethylenediamino)-2',3'-O-isopropylideneadenosine, m.p. 124°–7°C.

A mixture of the imidazolidine derivative (9.6 g., 16 mmoles) and dry Dowex 50 ($H^+$) resin (24 g.) in aqueous tetrahydrofuran (1:1) is stirred at room temperature for 40 minutes. The resin is removed by filtration and washed with tetrahydrofuran. The combined filtrates are evaporated in vacuo and the resulting precipitate is collected, washed with water, and dried in vacuo at 40°C giving $N^6$-benzoyl-2',3'-O-isopropylideneadenosine 5'-aldehyde hydrate, m.p. 127°–9°C.

In like manner, $N^6$-acetyl-2',3'-O-isopropylideneadenosine 5'-aldehyde hydrate and $N^2$-acetyl-2',3'-O-isopropylideneguanosine 5'-aldehyde hydrate and 2',3'-O-isopropylideneinosine 5'-aldehyde hydrate are prepared.

EXAMPLE 4

A 1M solution of methyl magnesium chloride (300 ml.) in tetrahydrofuran is added at 20°C over 10 minutes to a stirred suspension of the aldehyde hydrate of Example 3 (13.0 g., 30.6 mmoles) in freshly distilled tetrahydrofuran (1.5 l.) in a nitrogen atmosphere. After 30 minutes, saturated aqueous ammonium chloride (70 ml.) is added and the inorganic salts are removed by filtration and washed with ethyl acetate (3 × 250 ml.). The combined organic layers are washed with aqueous sodium bicarbonate (2 × 250 ml.), water (2 × 250 ml.) and dried over sodium sulfate. Removal of the solvent gives a mixture of isomeric products as a foam.

This mixture is applied to a column of silica gel (1.1 kg., 6% by weight water added) prepared in carbon tetrachloride. Elution with a linear gradient from carbon tetrachloride-chloroform 1:1 (4 liters) to carbon tetrachloridechloroform-acetone 1:1:4 (4 liters) gives, after pooling of the appropriate fractions, $N^6$-benzoyl-9-(6-deoxy-2,3-O-isopropylidene-β-allofuranosyl)-adenine and $N^6$-benzoyl-9-(6-deoxy-2,3-O-isopropylidene-α-L-talofuranosyl)-adenine together with a mixture of the compounds enriched in the α-L-talo compound.

In a similar manner, $N^2$-benzoyl-9-(6-deoxy-2,3-O-isopropylidene-β-D-allofuranosyl)-guanine, $N^2$-benzoyl-9-(6-deoxy-2,3-O-isopropylidene-α-L-talofuranosyl)-guanine, 9-(6-deoxy-2,3-O-isopropylidene-β-allofuranosyl)-inosine, and 9-(6-deoxy-2,3-O-isopropylidene-α-L-talofuranosyl)-inosine and each of these compounds in the N-acetyl series, e.g., $N^6$-acetyl-9-(6-deoxy-2,3-O-isopropylidene-α-L-talofuranosyl)-adenine, are prepared.

Employing an alkylmagnesium chloride other than methylmagnesium chloride in the above procedure produces the other 6-C-alkyl-6-deoxy compounds, for example, $N^6$-benzoyl-9-(6-C-methyl-6-deoxy-2,3-O-isopropylidene-β-D-allofuranosyl)-adenine, $N^6$-benzoyl-9-(6-C-methyl-6-deoxy-2,3-O-isopropylidene-α-L-talofuranosyl)-adenine, $N^2$-benzoyl-9-(6-C-methyl-6-deoxy-2,3-O-isopropylidene-β-D-allofuranosyl)-guanine, $N^2$-benzoyl-9-(6-C-methyl-6-deoxy-2,3-O-isopropylidene-α-L-talofuranosyl)-guanine, 9-(6-C-methyl-6-deoxy-2,3-O-isopropylidene-β-D-allofuranosyl)-hypoxanthine, 9-(6-C-methyl-6-deoxy-2,3-O-isopropylidene-α-L-talofuranosyl)-hypoxanthine, and the 48 compounds corresponding to the above six compounds in each of the 6-C-ethyl, 6-C-n-propyl, 6-C-isopropyl, 6-C-n-butyl, 6-C-sec-butyl, 6-C-isobutyl, 6-C-t-butyl, and 6-C-pentyl series. In like manner, the corresponding N-acetyl compounds are prepared from the respective N-acetyl substrates.

Alternatively, the aldehyde hydrate is converted to the free aldehyde by azeotropic distillation of a benzene solution in a Dean and Stark apparatus. The resulting aldehyde is then reacted as above with the alkylmagnesium halide except that the reaction is carried out at −78°C. for 15 minutes.

EXAMPLE 5

To a solution of $N^6$-benzoyl-9-(6-deoxy-2,3-O-isopropylidene-β-D-allofuranosyl)-adenine (246 mg., 1 mmole) and dicyclohexylcarbodiimide (620 mg., 3 mmoles) in a mixture of benzene (3 ml.), pyridine (0.08 ml.) and dimethylsulfoxide (3ml.) is added trifluoroacetic acid (0.04 ml.). The mixture is maintained at about 20°–25°C during the early exothermic reaction by occasional cooling in a ice bath and then stored at 20°C for 16 hours. Ethyl acetate (10 ml.) is added followed by a saturated methanolic solution of oxalic acid dihydrate (0.185g.). After a further 30 minutes at 20°C, the N,Nα-dicyclohexylurea is removed by filtration and washed thoroughly with ethyl acetate. The combined filtrate and washings are extracted twice with water, dried (MgSO₄) and evaporated to dryness giving N⁶-benzoyl-9-(6-deoxy-2,3-O-isopropylidene-β-D-ribo-hexofuran-5-ulosyl)-adenine as a foam.

The same product is obtained using N⁶-benzoyl-9-(6-deoxy)-2,3-O-isopropylidene-α-L-talofuranosyl) adenine as the starting material. The same product is also prepared by preferably using the more readily available mixture of α-L-talo and β-D-allo isomers in this reaction, thus avoiding the necessity of the chromatographic separation of the two isomers described in Ex- In like manner, N²-acetyl-9-(6-deoxy-2,3-O-isopropylidene-β-D-ribohexofuran-5-ulosyl)-guanine and 9-(6-deoxy-2,3-O-isopropylidene-β-D-ribohexofuran-5-ulosyl)-hypoxanthine are prepared.

EXAMPLE 6

The 5'-keto products of Example 5 are treated according to the procedure of Example 4 above to respectively prepare the following compounds:

N⁶-benzoyl-2',3'-O-isopropylidene-5',5'-di-C-methyladenosine,
N²,acetyl-2',3'-O-isopropylidene-5',5'-di-C-methylguanosine,
2',3'-isopropylidene-5',5'-di-C-methylinosine and the 27 compounds corresponding to the above three compounds in each of the 5',5'-di-C-ethyl, -n-propyl, -isopropyl, -nbutyl, -sec-butyl, -isobutyl, -t-butyl, -pentyl and -hexyl series.

EXAMPLE 7

9-(2,3-O-isopropylidene-β-D-ribofuranosyluronic acid)-adenine is prepared by the method of Schmidt et al., Chem. Ber., 101, 590-4 (1968). A suspension of the thus prepared acid (1.18 g., 3.7 mmoles) in dioxane-methanol (1:1, 1 liter) is cooled in ice and a solution of diazomethane (prepared from 15 g. nitrosomethylurea) in ether (200 ml.) is added. After 15 minutes, the mixture is concentrated in vacuo and the residue is crystallized from methanol giving the methyl ester product, m.p. 240°–3°, recrystallization from methanol.

The methyl esters of 9-(2,3-O-isopropylidene-β-D-ribofuranosyluronic acid)-guanosine and of 9-(2,3-isopropylidene-β-D-ribofuranosyluronic acid)-inosine are also thus prepared.

EXAMPLE 8

A 3M solution of methylmagnesium chloride in tetrahydrofuran (4.8 ml., 14.3 mmoles) is added to a stirred suspension of methyl 9-(2,3-O-isopropylidene-β-D-ribofuranosyluronate)-adenine (0.479 g., 1.43 mmoles) in anhydrous tetrahydrofuran (40 ml.). The resulting clear solution is kept at room temperature for 1 hour and then saturated aqueous ammonium chloride (15 ml.) is added. The precipitated salts are removed by filtration and washed with fresh tetrahydrofuran. The combined filtrates are concentrated in vacuo and the residue is crystallized from acetonehexane giving 2',3'-O-isopropylidene-5',5'-di-C-methyladenosine, m.p. 270°–2°C.

In a similar manner, 2',3'-O-isopropylidene-5',5'-di-C-methylguanosine and 2',3'-O-isopropylidene-5',5'-di-C-methylinosine are prepared and the 27 compounds corresponding to the three above compounds in each of the 5',5'-di-C-ethyl, -n-propyl, -isopropyl, -n-butyl, -sec-butyl, -isobutyl, -t-butyl, -pentyl, and -hexyl series upon using the appropriate alkyl magnesium chloride in lieu of methylmagnesium chloride.

EXAMPLE 9

Benzoyl chloride (1.08 ml., 9 mmoles) is added to a suspension of 2',3'-O-isopropylidene-5',5'-di-C-methyladenosine (1.2g., 3.58 mmoles) in dry pyridine (30 ml.) at 0°. The mixture was stirred at 20° for 90 minutes. Sodium hydroxide solution (2N) (35 ml.) was added and the mixture is kept at 20° for a further 60 minutes. The solution is adjusted at 0°C to pH 7 by the addition of acetic acid and the solvents are removed in vacuo. The residue is partitioned between chloroform and water and then the chloroform layer is washed successively with 1N hydrochloric acid, aqueous sodium bicarbonate solution and water and then dried over magnesium sulfate. Evaporation of the solvent gives the product as a foam. Purification is effected by chromatography on a silica gel column (170g. deactivated with 6% water) eluting with a linear gradient of carbon tetrachloride (2 liters) to acetyl-tetrachloride-acetone (3:2, 2 liters). The appropriate fractions are pooled and concentrated in vacuo giving the N⁶-benzoyl-2',3'-O-isopropylidene-5',5'-di-C-methyladenosine product.

In like manner, N² acetyl-2',3°-O-isopropylidene-5',5'-di-C-methylguanosine is prepared using acetyl chloride and the N⁶-benzoyl and N²-acetyl derivatives of the other appropriate 5',5'-di-C-alkyl substrates of Example 8 are prepared.

EXAMPLE 10

The alcohol N⁶-benzoyl-9-(6-deoxy-2,3-O-isopropylidene-β-D-allofuranosyl)-adenine (1.40 g., 3.3 mmoles) is dried by evaporation in vacuo of a solution in dry pyridine (2 × 5 ml.). The residue is redissolved in dry pyridine (5 ml.) and a solution of bis-2,2,2-trichloroethylphosphorochloridate (6.25 g., 16.5 mmoles) in pyridine (10 ml.) is added at 0°C. The mixture is stirred for 1 hour at room temperature, cooled in an ice bath, water (10 ml.) is added and the mixture is evaporated to dryness in vacuo. The residue is dissolved in chloroform (100 ml.) and the solution washed with aqueous sodium bicarbonate solution (2 × 50 ml.), water (2 × 50 ml.) and dried over magnesium sulfate. Removal of the solvents in vacuo gives N⁶-benzoyl-9-[6-deoxy-2,3-O-isopropylidene-5-O-(bis-2,2,2-trichloroethylphosphoryl)-β-D-allofuranosyl]-adenine as a foam.

By repeating the above procedure with N⁶-benzoyl-9-(6-deoxy-2,3-O-isoproyplidene-α-L-talofuranosyl)-adenine, there is obtained N⁶-benzoyl-9-[6-deoxy-2,3-O-isopropylidene-5-O-(bis-2,2,2-trichloroethylphosphoryl)-α-L-talofuranosyl]-adenine.

In a similar manner, the corresponding 5-O-(bis-2,2,2-trichlorethylphosphoryl) compounds of the other substrates of Example 4, e.g., N²-acetyl-9-[6-deoxy-2,3-O-isopropylidene-5-O-(bis-2,2,2-trichloroethylphosphoryl)-β-D-allofuranosyl]-guanine, N²-acetyl-9-[6-deoxy-2,3,-O-isopropylidene-5-O-(bis-2,2,2-trichloroethylphosphory)-α-L-talofuranosyl]-guanine, 9-[6-deoxy-2,3-O-isopropylidene-5-O-(bis-2,2,2trichloroethylphosphoryl)-β-D-allofuranosyl]-hypoxanthine, and 9-[6-deoxy-2,3-O-isopropylidene-5-O-(bis-2,2,2-trichloroethylphosphoryl)-α-L-talofuranosyl]-hypoxanthine and the corresponding 6-C-alkyl derivatives thereof, are prepared.

EXAMPLE 11

A solution of N⁶-benzoyl-9-[6-deoxy-2,3-O-isopropylidene-5-O-(bis2,2,2-trichloroethylphosphoryl)-β-D-allofuranosyl)-adenine (5.52 g., 7.2 mmoles) in 90% trifluoroacetic acid (60 ml.) is kept at room temperature for 30 minutes and then is concentrated in vacuo. The residue is largely freed of trifluoroacetic acid by repeated evaporation with ethanol. Addition of ether then gives a solid which slowly crystallizes and is collected by filtration giving $N^6$-benzoyl-9-[6-deoxy-5-O-(bis-2,2,2-trichloroethylphosphoryl)-β-D-allofuranosyl]-adenine.

By repeating the above procedure with $N^6$-benzoyl-9-[6-deoxy-2,3-O-isopropylidene-5-O-(bis-2,2,2-trichloroethylphosphoryl)-α-L-talofuranosyl]-adenine, there is obtained $N^6$-benzoyl-9-[6-deoxy-5-O-(bis-2,2,2-trichloroethylphosphoryl)-α-L-talofuranosyl]-adenine as a foam following purification by silica-gel column chromatography.

Similarly, the other products of Examples 10 are hydrolyzed to the 2',3'-dihydroxy compounds.

EXAMPLE 12

Acetic acid (4 ml., 68 mmoles) is added dropwise to an ice-cold, stirred suspension of zinc dust (1.75 g., 27 mmoles) in a solution of the $N^6$-benzoyl-9-[6-deoxy-5-O-(bis-2,2,2-trichloroethylphosphoryl)-β-D-allofuranosyl]-adenine (1.1 g., 1.5 mmoles) in dimethylformamide (10 ml.). After 30 minutes at 0°–5°C, the mixture is filtered and the filtrate is concentrated in vacuo. Water (50 ml.) is added to the residue and a clear solution is obtained by the addition of Dowex 50 ($NH_4^+$). The zinc ions are removed by passing the solution through a Dowex 50 ($NH_4^+$) column (36 × 2 cm.). Concentration of the eluate gives a syrupy residue which is stirred at room temperature for 16 hours with 7N aqueous ammonium hydroxide (20 ml.). The solution is again evaporated to dryness and the residue is chromatographed on a column (40 × 3 cm.) of DEAE Sephadex (bicarbonate form) using a linear gradient elution from water (2.5 liters) to 0.25M triethylammonium bicarbonate pH 7.5 (2.5 liters). The appropriate fractions are pooled and concentrated giving the product as the triethylammonium salt (620 mg.). The salt is dissolved in 50% aqueous ethanol (3 ml.) and the solution is adjusted to pH 2.5 with 1N hydrochloric acid giving the 9-(6-deoxy-5-O-phosphoryl-β-D-allofuranosyl)-adenine product as a white powder.

By repeating the above procedure with $N^6$-benzoyl-[6-deoxy-5-O-(bis-2,2,2-trichloroethylphosphoryl)-α-L-talofuranosyl]-adenine, there is obtained the corresponding 9-(6-deoxy-5-O-phosphoryl-α-L-talofuranosyl)-adenine as a powder.

Similarly, the other products of Example 11 are converted to the corresponding unprotected (if necessary) 5-O-phosphoryl compounds.

EXAMPLE 13

A suspension of (620 mg., 1.1 mmoles) of the triethylammonium salt of 9-(6-deoxy-5-O-phosphoryl-β-D-allofuranosyl)-adenine in pyridine (25 ml.) is solubilized by the addition of 4-morpholine-N,N'-dicyclohexylcarboxamidine (322 mg., 1.1 mmoles). The salt if dried by repeatedly adding dry pyridine followed by evaporation in vacuo. A solution of the residue in dry pyridine (120 ml.) is added, over two hours, to a refluxing solution of dicyclohexylcarbodiimide (495 mg., 2.2 mmoles) in dry pyridine (210 ml.). The solution is refluxed for a further 2 hours, the pyridine is removed in vacuo and the residue is partitioned between water (100 ml.) and ether (100 ml.) N,N'-Dicyclohexylurea is removed by filtration and the aqueous layer is chromatographed on a 40 × 3 cm. column of DEAE-Sephadex (bicarbonate form using a linear gradient elution from water (2.5 liters) to 0.15M triethylammonium bicarbonate pH 7.5 (2.5 liters). The appropriate fractions are pooled and concentrated giving the product as the triethylammonium salt. A solution of this salt in 50% aqueous ethanol (4 ml.) is adjusted to pH 2 with 1N hydrochloric acid whereupon the free nucleotide separates out as crystals. There are collected, washed with water and ethanol and dried giving 9-(6-deoxy-β-D-allofuranosyl)-adenine 3',5'-cyclicphosphate.

By repeating the above procedure with 9-(6-deoxy-5-phosphoryl-α-L-talofuranosyl)-adenine, there is obtained the corresponding 9-(6-deoxy-α-L-talofuranosyl)-adenine 3',5'-cyclicphosphate.

In a similar manner, the other products of Example 12 are converted by the corresponding 3',5'-cyclicphosphate compounds, e.g., 9-(6-deoxy-β-D-allofuranosyl)-guanine 3',5'-cyclicphosphate, 9-(6-deoxy-α-L-talofuranosyl)-guanine 3',5'-cyclicphosphate, 9-(6-deoxy-β-D-allofuranosyl)-hypoxanthine 3',5'-cyclicphosphate, 9-(6-deoxy-α-L-talofuranosyl)-hypoxanthine 3',5'-cyclicphosphate, 9-(6-deoxy-6-C-methyl-β-D-allofuranosyl)-adenine 3',5'-cyclicphosphate, 9-(6-deoxy-6-C-methyl-α-L-talofuranosyl)-adenine 3',5'-cyclicphosphate, 9-(6-deoxy-6-C-methyl-β-D-allofuranosyl)-guanine 3',5'-cyclicphosphate, 9-(6-deoxy-6-C-methyl-α-L-talofuranosyl)-guanine 3',5'-cyclicphosphate, 9-(6-deoxy-6-C-methyl-β-D-allofuronsyl)-hypoxanthine 3',5'-cyclicphosphate, 9-(6-deoxy-6-C-methyl-α-L-talofuranosyl)-hypoxanthine 3',5'-cyclicphosphate, 9-(6-deoxy-6-C-ethyl-β-D-allofuranosyl)-adenine 3',5'-cyclicphosphate, 9-(6-deoxy-6-C-ethyl-α-L-talofuranosyl)-adenine 3',5'-cyclicphosphate, 9-(6-deoxy-6-C-ethyl-β-D-allofuranosyl)-guanine 3',5'-cyclicphosphate, 9-(6-deoxy-6-C-ethyl-β-L-talofuranosyl)-guanine 3',5'-cyclicphosphate, 9 9-(6-deoxy-6-C-ethyl-β-D-allofuranosyl)-hypoxanthine 3',5'-cyclicphosphate, 9-(6-deoxy-6-C-ethyl-α-L-talofuranosyl)-hypoxanthine 3',5'-cyclicphosphate, 9-(6-deoxy-6-C-n-propyl-β-D-allofuranosyl)-adenine 3',5'-cyclicphosphate, 9-(6-deoxy-6-C-n-propyl-α-L-talofuranosyl)-adenine 3',5'-cyclicphosphate, 9-(6-deoxy-6-C-n-propyl-β-D-allofuranosyl)-guanine 3',5'-D-allofuranosyl)-hypoxanthine -cyclicphosphate, 9-(6-deoxy-6-C-n-propyl-α-L-talofuranosyl)-guanine 3',5'-cyclicphosphate, 9-(6-deoxy-6-C-n-propyl-β-D-allofuranosyl)-hypoxanthine 3',5'-cyclicphosphate, 9-(6-deoxy-6-C-n-propyl-α-L-talofuranosyl)-hypoxanthine 3',5'-cyclicphosphate, 9-(6-deoxy-6-C-isopropyl-β-D-allofuranosyl)-adenine 3',5'-cyclicphosphate, 9-(6-deoxy-6-C-isopropyl-α-L-talofuranosyl)adenine 3',5'-cyclicphosphate, 9-(6-deoxy-6-C-isopropyl-β-D-allofuranosyl)-guanine 3',5'-cyclicphosphate, 9-(6-deoxy-6-C-isopropyl-α-L-talofuranosyl)-guanine 3',5'-cyclicphosphate, 9-(6-deoxy-6-C-isopropyl-β-D-allofuransoyl)-hypoxanthine 3',5'-cyclicphosphate, 9-(6-deoxy-6-C-isopropyl-α-L-talofuranosyl)-hypoxanthine 3',5'-cyclicphosphate, 9-(6-deoxy-6-C-n-butyl-β-D-allofuranosyl)-adenine 3',5'-cyclicphosphate, 9-(6-deoxy-6-C-n-butyl-α-L-talofuranosyl)-adenine 3',5'-cyclicphosphate, 9-(6-deoxy-6-C-n-butyl-β-D-allofuranosyl)-guanine 3',5'-cyclicphosphate, 9-(6-deoxy-6-C-n-butyl-α-L-talofuranosyl)-guanine 3',5'-cyclicphosphate, 9-(6-deoxy-6-C-n-butyl-β-D-allofuranosyl)-hypoxanthine 3',5'-cyclicphosphate, 9-(6-deoxy- 6-C-n-butyl-α-L-talofuranosyl)-hypoxanthine 3',5'-cyclicphosphate, 9-

(6-deoxy-6-C-secbutyl-β-D-allofuranosyl)-adenine 3',5'-cyclicphosphate, 9-(6-deoxy-6-C-sec-butyl-α-L-talofuranosyl)-adenine 3',5'-cyclicphosphate, 9-(6-deoxy-6-C-sec-butyl-β-D-allofuranosyl)-guanine 3',5'-cyclicphosphate, 9-(6-deoxy-6-C-sec-butyl-α-L-talofuranosyl)-guanine 3',5'-cyclicphosphate, 9-(6-deoxy-6-C-sec-butyl-β-D-allofuranosyl)-hypoxanthine 3',5'-cyclicphosphate, 9-(6-deoxy-6-C-sec-butyl-α-L-talofuranosoyl)-hypoxanthine 3',5'-cyclicphosphate, 9-(6-deoxy-6-C-isobutyl-β-D-allofuranosyl)-adenine 3', 5'-cyclicphosphate, 9-(6-deoxy-6-C-isobturyl-α-L-talofuranosyl)-adenine 3', 5'-cyclicphosphate, 9-(6-deoxy-6-C-isobutyl-β-D-allofuranosyl)-guanine 3', 5'-cyclicphosphate, 9-(6-deoxy-6-C-isobutyl-α-L-talofuranosyl)-guanine 3', 5'-cyclicphosphate, 9-(6-deoxy-6-C-isobutyl-β-D-allofuranosyl)-hypoxanthine 3', 5'-cyclicphosphate, 9-(6-deoxy-6-C-isobutyl-α-L-talofuranosyl)-hypoxanthine 3', 5'-cyclicphosphate, 9-(6-deoxy-6-C-t-butyl-β-D-allofuranosyl)-adenine 3', 5'-cyclicphosphate, 9-(6-deoxy-6-C-t-butyl-α-L-talofuranosyl)-adenine 3', 5'-cyclicphosphate, 9-(6-deoxy-6-C-t-butyl-β-D-allofuranosyl)-guanine 3', 5'-cyclicphosphate, 9-(6-deoxy-6-C-t-butyl-α-L-talofuranosyl)-guanine 3', 5'-cyclicphosphate, 9-(6-deoxy-6-C-t-butyl-β-D-allofuranosyl)-hypoxanthine 3', 5'-cyclicphosphate, 9-(6-deoxy-6-C-t-butyl-α-L-talofuranosyl)-hypoxanthine 3', 5'-cyclicphosphate, 9-(6-deoxy-6-C-pentyl-β-D-allofuranosyl)-adenine 3', 5'-cyclicphosphate, 9-(6-deoxy-6-C-pentyl-α-L-talofuranosyl)-adenine 3', 5'-cyclicphosphate, 9-(6-deoxy-6-C-pentyl-β-D-allofuranosyl)-guanine 3', 5'-cyclicphosphate, 9-(6-deoxy-6-C-pentyl-α-L-talofuranosyl)-guanine 3', 5'-cyclicphosphate, 9-(6-deoxy-6-C-pentyl-β-D-allofuranosyl)-hypoxanthine 3', 5'-cyclicphosphate, 9-(6-deoxy-6-C-pentyl-α-L-talofuranosyl)-hypoxanthine 3', 5'-cyclicphosphate.

EXAMPLE 14

A solution of freshly distilled bis-2,2,2-trichloroethylphosphorochloridate (12.65g, 33 mmole) in dry pyridine (25 ml.) is added dropwise to an ice cold solution of $N^6$-benzoyl-2',3'-O-isopropylidene-5,5'-di-C-methyladenosine (1.43g, 3.26 mmole) in dry pyridine (50 ml.). The reaction mixture is stirred at 20° for 161 hours, cooled to 0°, treated with water (50 ml.) and kept at 20° for a further 2 hours. The solvents are removed in vacuo and the residue is partitioned between chloroform and water. The aqueous layer is extracted twice with chloroform, the combined organic extracts are successively washed with ice-cold 1N hydrochloric acid, water, saturated aqueous sodium bicarbonate, water and dried over magnesium sulfate. Evaporation of the solvents in vacuo gives residue (2.72g). This is chromatographed on a silica gel column (300g) using a linear gradient elution from carbon tetrachloride (2 l.) to carbon tetrachloride acetone (7:3, 2 l.). The appropriate fractions are pooled and concentrated in vacuo to give the $N^6$-benzoyl-2',3'-O-isopropylidene-5',5'-di-C-methyl-5'-O-bis-2,2,2-trichloroethylphosphoryladenosine product as a foam.

The resultant product is treated according to the procedures of Examples 11 to 13 to give the 5',5'-di-C-methyladenosine 3',5'-cyclicphosphate product.

In a similar manner, the other products of Example 9 are converted to the corresponding 3',5'-cyclicphosphate compounds, e.g., 5',5'-di-C-methylguanosine 3',5'-cyclicphosphate, 5',5'-di-C-methylinosine 3',5'-cyclicphosphate, 5',5'-di-C-ethyladenosine 3',5'-cyclicphosphate, 5',5'-di-C-ethylguanosine 3',5'-cyclicphosphate, 5',5'-di-C-ethylinosine 3',5'-cyclicphosphate, 5',5'-di-C-n-propyladenosine 3',5'-cyclicphosphate, 5',5'-di-C-n-propylguanosine 3',5'-cyclicphosphate, 5',5'-di-C-n-propylinosine 3',5'-cyclicphosphate, 5',5'-di-C-isopropyladenosine 3',5'-cyclicphosphate, 5',5'-di-C-isopropylguanosine 3',5'-cyclicphosphate, 5', -di-C-isopropylinosine 3',5'-cyclicphosphate, 5',5'-di-C-n-butyladenosine 3',5'-cyclicphosphate, 5',5'-di-C-n-butylguanosine 3',5'-cyclicphosphate, 5',5'-di-C-n-butylinosine 3',5'-cyclicphosphate, 5',5'-di-C-sec-butyladenosine 3',5'-cyclicphosphate, 5',5'-di-C-sec-butylguanosine 3',5'-cyclicphosphate, 5',5'-di-C-sec-butylinosine 3',5'-cyclicphosphate, 5',5'-di-C-isobutyladenosine 3',5'-cyclicphosphate, 5',5'-di-C-isobutylguanosine 3',5'-cyclicphosphate, 5',5'-di-C-isobutylinosine 3',5'-cyclicphosphate, 5',5'-di-C-t-butyladenosine 3'5'-cyclicphosphate, 5',5'-di-C-t-butylguanosine 3',5'-cyclicphosphate, 5',5'-di-C-t-butylinosine 3',5'-cyclicphosphate, 5',5'-di-C-pentyladenosine 3',5'-cyclicphosphate, 5',5'di-C-pentylguanosine 3',5'-cyclicphosphate, 5',5'-di-C-pentylinosine 3',5'-cyclicphosphate, 5',5'-di-C-hexyladenosine 3',5'-cyclicphosphate, 5',5'-di-C-hexylguanosine 3',5'-cyclicphosphate, 5',5'-di-C-hexylinosine 3',5'-cyclicphosphate.

EXAMPLE 15

Barium cyanoethylphosphate (2.28g, 7 mmoles) is mixed with water (20 ml.) and is solubilized by the addition of Dowex 50 ($H^+$) resin. The solution is passed through a column of Dowex 50 ($H^+$) (20 × 2 cm.) which is washed with about five column volumes of water. The acidic eluate is neutralized with pyridine, evaporated to dryness in vacuo and the last traces of water are removed by coevaporation (twice) with anhydrous pyridine. The residue is dissolved in dry pyridine (50 ml.), $N^6$-benzoyl-9-(6-deoxy-2,3-O-isopropylidene-β-D-allofuranosyl)-adenine (1.5g., 3.5 mmoles) is added followed by dicyclohexylcarbodiimide (2.92g., 14 mmoles) and the resultant mixture is stored at 20° for 20 hours. A further quantity of dicyclohexylcarbodiimide (1.46 g., 7 mmoles) is added and the reaction mixture is stored at 20° for a further 22 hours. Water (20 ml.) is then added and the mixture stored at 20° for 1 hour. The solvents are removed in vacuo and water is added to the residue. The unsoluble N,N'-dicyclohexylurea if filtered off, the filtrate is evaporated to dryness in vacuo is give the pyridinium salt of $N^6$-benzoyl-9-[5-O-(2-cyanoethylphosphoryl)-6-deoxy-2,3-O-isopropylidene-β-D-allofuranosyl]-adenine. Further purification of this material is achieved, if desired by chromatography on DEAE sephadex as described in Example 15B.

EXAMPLE 15B

The product of the procedure described in Example 15A is subjected to the procedure of Example 11 thereby giving $N^6$-benzoyl-9[5-O-(2-cyanoethylphosphoryl)-6-deoxy-β-D-allofuranosyl]-adenine.

EXAMPLE 15C

The product of Example 15B (3 mmoles) is dissolved in 8N ammonium hydroxide (50 ml.), stored at room temperature for 24 hours and then heated to 50°C for 1 hour. The solvents are removed in vacuo and the residue is dissolved in water (200 ml.) and applied to a column of DEAE sephadex (45 × 4 cm.) (bicarbonate form). Elution of the column with a linear gradient of triethylammonium bicarbonate (2 liters 0.005M to 2 liters of 0.2M) followed by pooling and evaporation of the appropriate fractions gives 9-(6-deoxy-5-O-phosphoryl-$\beta$-D-allofuranosyl)-adenine as the triethylammonium salt. This is converted to the free acid as described in Example 12.

EXAMPLE 16A

By repeating this procedure of Example 15A but replacing bariumcyanoethylphosphate with sodium-p-nitrophenylphosphate and pyridine (50 ml.) with pyridine (25 ml.) and dimethylformamide (25 ml.), there is obtained $N^6$-benzoyl-9-[6-deoxy-2,3-O-isopropylidene-5-O-(p-nitrophenylphosphoryl)-$\beta$-D-allofuranosyl]-adenine.

EXAMPLE 16B

By repeating the procedure of Example 15B but using the products of Example 16A instead of those of Example 15A, there is obtained $N^6$-benzoyl-9-[6-deoxy-5-O-(p-nitrophenylphosphoryl)-$\beta$-D-allofuranosyl]-adenine.

EXAMPLE 16C

By repeating the procedure of Example 15C but using the products of Example 16B instead of those of Example 15B, there is obtained 9-[6-deoxy-5-O-(p-nitrophenylphosphoryl)-$\beta$-D-allofuranosyl]-adenine.

EXAMPLE 16D

The sodium salt of 9-[6-deoxy-5-O-(p-nitrophenylphosphoryl)-$\beta$-D-allofuranosyl]-adenine (0.2 mmole) is dissolved in dimethylsulfoxide (18 ml.) and is treated at 20°C with a 1M solution of potassium t-butoxide in t-butyl alcohol (2 ml.). After 5 minutes, the reaction is neutralized with excess Amberlite IR-120 resin ($NH_4^+$ form). The resin is washed thoroughly with dilute ammonium hydroxide, the aqueous solution is evaporated in vacuo, dissolved in water (25 ml.) and applied to a DEAE sephadex column (bicarbonate form). Elution of the column, as described in Example 13, followed by pooling and evaporation of the appropriate fractions and by crystallization at pH 2.5 gives 9-(6-deoxy-$\beta$-D-allofuranosyl)-adenine 3',5'-cyclicphosphate as a powder.

The foregoing procedures of Examples 15 and 16 are repeated to prepare:

9-(6-deoxy-$\alpha$-L-talofuranosyl)-adenine 3',5'-cylicphosphate,
9-(6-deoxy-$\beta$-D-allofuranosyl)-guanine 3',5'-cyclicphosphate,
9-(6-deoxy-$\alpha$-L-talofuranosyl)-guanine 3',5'-cyclicphosphate,
9-(6-deoxy-$\beta$-D-allofuranosyl)-hypoxanthine 3',5'-cyclicphosphate,
9-(6-deoxy-$\alpha$-L-talofuranosyl)-hypoxanthine 3',5'-cyclicphosphate, and the corresponding 6-C-alkyl and 5',5'-di-C-alkyl compounds hereof.

EXAMPLE 17

To a solution of 9-(6-deoxy-$\beta$-D-allofuranosyl)-adenine 3',5'-cyclicphosphate (from Example 13), (343 mg., 1 mmole) in 1 ml. of 1N sodium hydroxide is added 6 ml. of 1M sodium acetate buffer (pH 3.9). A solution of bromine (220 mg.) in 8 ml. of 1M sodium acetate buffer (pH 3.9) is then added and the resulting solution is stirred overnight at 20°. The resulting precipitate is collected by filtration and washed with water to give the chromatographically pure product namely 8-bromo-9-(6-deoxy-$\beta$-D-allofuranosyl)-adenine 3',5'-cyclicphosphate. The filtrate is passed through a charcoal column (4 g.) and the column is washed with water. An additional quantity of the product is obtained by elution of the charcoal column with the solvent mixture ethanol-water-ammonium hydroxide (50:45:5) followed by crystallization of the product as the free acid at pH 2-3.

In like manner, the corresponding 8-bromo compounds in the guanine and hypoxanthine series are prepared from the appropriate substrates of Example 13.

EXAMPLE 18

8-Bromo-9-(6-deoxy-$\beta$-D-allofuranosyl)-adenine 3',5'-cyclicphosphate (422 mg., 1 mmole) is added to a solution of methanol (10 ml.) containing sodium methoxide (2.2 g., 4 mmoles) and methanethiol (1 ml.). The resulting reaction mixture is heated under reflux for 4 hours and then the solvent is removed by evaporation in vacuo. The residue is dissolved in water and the pH of the solution is adjusted to less than 3 by the addition of 3N hydrochloric acid causing crystallization of the product. The crystals are filtered, washed with water and dried to give 9-(6-deoxy-$\beta$-D-allofuranosyl)-8-methylthioadenine 3',5'-cyclicphosphate.

In like manner 9-(6-deoxy-$\alpha$-L-talofuranosyl)-8-methylthioadenine 3',5'-cyclicphosphate, 5',5'-di-C-methyl-8-methylthioadenosine 3',5'-cyclicphosphate, 9-(6-deoxy-$\beta$-D-allofuranosyl)-8-methylthioguanine 3',5'-cyclicphosphate, 9-(6-deoxy-$\alpha$-L-talofuranosyl)-8-methylthioguanine 3',5'-cyclicphosphate, di-C-methyl-8-methylthioguanosine 3',5'-cyclicphosphate, 9-(6-deoxy-$\beta$-D-allofuranosyl)-8-methylthiohypoxanthine 3',5'-cyclicphosphate, 9-(6-deoxy-$\alpha$-L-talofuranosyl)-8-methylthiohypoxanthine 3',5'-cyclicphosphate, and 5+,5'-di-C-methyl-8-methylthioinosine are prepared.

Upon substituting an alternate alkanethiol for methanethio in the above procedure, the corresponding 8-alkylthio products are prepared. Similarly the 8-aralkylthio and 8-arylthio products are prepared, e.g., 9-(6-deoxy-$\beta$-D-allofuranosyl)-8-benzylthioadenine 3',5'-cyclicphosphate, 9-(6-deoxy-$\beta$-D-allofuranosyl)-8-phenylthioadenine 3',5'-cyclicphosphate, 9-(6-deoxy-$\beta$-D-allofuranosyl)-8-(p-bromophenylthio)-adenine 3',5'-cyclicphosphate, 9-(6-deoxy-$\beta$-D-allofuranosyl)-8-(p-methoxyphenylthio)-adenine 3',5'-cyclicphosphate, and 9-(6-deoxy-$\beta$-D-allofuranosyl)-8-(o,p-dinitrophenylthio)-adenine 3',5'-cyclicphosphate.

EXAMPLE 19

A solution of 8-bromo-9-(6-deoxy-$\beta$-D-allofuranosyl)-adenine 3',5'-cyclicphosphate (422 mg., 1 mmole) and benzylamine (0.42 g., 4 mmoles) in 5 ml. ethanol and 1 ml. of dimethylsulfoxide is heated under reflux for 16 hours. The reaction mixture is cooled to room temperature, diluted to a volume of 100 ml. with water and applied to a column of DEAE-sephadex (45 cm. × 2.3 cm.) (bicarbonate form). The column is eluted with a linear gradient of triethylammonium bicarbonate (2 liters of 0.005M to 2 liters of 0.15M). The appropriate fractions containing the product are pooled and evaporated to dryness in vacuo. The residue is dissolved in 50% aqueous ethanol and the pH of the solution is adjusted to less than 3 by the addition of 3N hydrochloric acid. The crystals formed are collected by filtration, washed with water and dried giving 8-benzylamino-9-(6-deoxy-β-D-allofuranosyl)-adenine 3',5'-cyclicphosphate as a solid.

In like manner, the corresponding 8-benzylamino compounds in each of the guanine and hypoxanthine series are prepared. Similarly, by substituting an alternate aralkylamine or an alkylamine for benzylamine in the above procedure, the corresponding 8-substituted products, e.g., 9-(6-deoxy-β-D-allofuranosyl)-8-methylaminoadenine 3',5'-cyclicphosphate, are prepared.

In like manner, by substituting a dialkylamine or diaralkylamine for benzylamine, the corresponding 8-dialkylamino and 8-diaralkylamino products are prepared.

EXAMPLE 20

A solution of 8-bromo-9-(6-deoxy-β-D-allofuranosyl)-adenine 3',5'-cyclicphosphate (422 mg., 1 mmole) in 6 ml. of methanol containing sodium (115 mg., 5 mmole) is heated at reflux for 6 hours. The solvent is evaporated in vacuo and the residue is purified as in the procedure of Example 16 giving 9-(6-deoxy-β-D-allofuranosyl)-8-methoxyadenine 3',5'-cyclicphosphate.

In like manner, the corresponding 8-methoxy substituted products in each of the guanine and hypoxanthine series are prepared. Similarly, by substituting an alternate alkyl alcohol or aryl alcohol or aralkyl alcohol for methanol, the corresponding 8-alkoxy and 8-aryloxy, 8-aralkoxy products, are prepared, e.g., 9(6-deoxy-β-D-allofuranosyl)-8-ethoxyadenine, 9-(6-deoxy-β-D-allofuranosyl)-8-phenyloxyadenine, 9-(6-deoxy-β-D-allofuranosyl)-8-benzyloxyadenine, 9-(6-deoxy-β-D-allofuranosyl)-8-(p-fluorophenyloxy)adenine, and 9-(6-deoxy-β-D-allofuranosyl)-8-(o,p-dimethylphenyloxy)-adenine.

EXAMPLE 21

A dimethylformimide (40 ml.) solution of 8-bromo-9-(6-deoxy-β-D-allofuranosyl)-adenine 3',5'-cyclicphosphate, (422 mg., 1 mmole) and sodium azide (0.13 g., 2 mmoles) is heated at 70° for 16 hours. Evaporation of the solvent in vacuo gives the crude product which is purified and crystallized as in the procedure of Example 16 giving 8-azido-9-(6-deoxy-β-D-allofuranosyl)-adenine 3,',5'-cyclicphosphate.

In like manner, the 8-azido compounds in each of the guanine and hypoxanthine series are prepared.

EXAMPLE 22

The product from Example 21 is dissolved in 40 ml. of water by the addition of 1 ml. of 1N sodium hydroxide. The solution is shaken in a hydrogen atmosphere in the presence of 10% palladium on charcoal (200 mg.) for 16 hours. The suspension is filtered through diatomaceous earth material and the filtrate is evaporated in vacuo to dryness. The residue is purified and crystallized as in the procedure of Example 16 giving 8-amino-9-(6-deoxy-β-D-allofuranosyl)-adenine 3',5'-cyclicphosphate.

In like manner, the 8-amino compounds in each of the guanine and hypoxanthine series are prepared.

EXAMPLE 23

A solution of 1N sodium hydroxide (7 ml.) thiourea (0.76 g., 10 mmoles) and 8-bromo-9-(6-deoxy-β-D-allofuranosyl)-adenine 3',5'-cyclicphosphate (2.11 g., 5 mmoles) is evaporated in vacuo to a solid residue. This is dissolved in 2-methoxyethanol (100 ml.) and the solution is heated at 100° for 48 hours. The reaction mixture is evaporated to dryness and the residue is purified and crystallized as in the procedure of Example 16 giving 9-(6-deoxy-β-D-allofuranosyl)-8-mercaptoadenine 3',5'-cyclicphosphate.

In like manner, the 8-mercapto(sulfhydryl) compounds in each of the guanine and hypoxanthine series are prepared.

EXAMPLE 24

A solution of 8-bromo-9-(6-deoxy-β-D-allofuranosyl)-adenine 3',5'-cyclicphosphate (844 mg., 2 mmoles), sodium acetate (1.64 g., 20 mmoles), acetic anhydride (4 ml.) and glacial acetic acid (40 ml.) is heated at 110°C for 4 hours. The reaction mixture is evaporated to dryness in vacuo and the residue is dissolved in methanolic ammonia and heated at 50°C for 3 days in a bomb. Evaporation of the solvent followed by purification and crystallization as in the procedure of Example 19 gives 9-(6-deoxy-β-D-allofuranosyl)-8-hydroxyadenine 3',5'-cyclicphosphate.

In like manner, the 8-hydroxy compounds in each of the guanine and hypoxanthine series are prepared.

EXAMPLE 25

A solution of 9-(6-deoxy-β-D-allofuranosyl)-adenine 3',5'-cyclicphosphate (343 mg. 1 mmole) in 5 ml. water and 0.14 ml. of triethylamine is evaporated to dryness in vacuo. The residue is dried by coevaporation three times with pyridine (5 ml.), dissolved in 10 ml. of anhydrous pyridine and 2.5 ml.) butyric anhydride is added. The resultant solution is stirred at 20°C in the dark for 16 hours, cooled in an ice-water bath, 5 ml. of water is added and the resultant mixture is kept at 0–5°C for 3 hours. The solvent is removed by evaporation in vacuo and the residue is dissolved in 100 ml. water and applied to a DEAE sephadex column (40 cm. × 2.5 cm.) (bicarbonate form). The column is eluded with a linear gradient of triethylammonium bicarbonate (2 liters of 0.005M to 2 liters of 0.15M); the appropriate ultraviolet light absorbing fractions are pooled and evaporated to dryness in vacuo at a temperature less than 35°C giving the triethylammonium salt 9-(2-O-butyryl-6-deoxy-β-D-allofuranosyl)-adenine 3',5'-cyclicphosphate. Other salt forms of the product are obtained either by precipitation techniques e.g., the calcium salt is prepared by the addition of ether to an ethanolic solution of calcium chloride and the product or by the ulilization of ion-exchange techniques e.g., passage of an aqueous solution of the calcium salt of the product through a column of Dowex 50 (Na⁺) yielding, after evaporation in vacuo, the sodium salt of the product.

In the manner, the other 2'-O-acyl, e.g. acetyl, compounds hereof are prepared upon use of an alternate acyl anhydride.

EXAMPLE 26

By repeating the procedure of Example 25 except that 5.0 ml. of butyric anhydride is used and that the reaction mixture is stored at 20°C for seven days gives the triethylammonium salt of 9-(2-O-butyryl-6-deoxy-β-D-allofuranosyl)-N⁶-butyryladenine 3′,5′-cyclicphosphate, which is converted to the calcium salt and/or the sodium salt by procedures as those described in Example 25. The dibutyryl compounds in the guanine and hypoxanthine series are also thus prepared.

EXAMPLE 27

To a solution of 9-(2-O-butyryl-6-deoxy-β-D-allofuranosyl)-N⁶-butytyladenine 3′,5′-cyclicphosphate (0.5 mmole) in 20 ml. ethanol is added 1 ml. of 2N sodiumhydroxide and the resultant mixture is kept at 20° for five minutes. The solution is rapidly cooled to about 5°C in an ice-bath and the pH is adjusted to 3 with 2N hydrochloric acid. The solution is then extracted several times with ether and then adjusted to pH7 with ammonium hydroxide. After dilution with 100 ml. of water, the mixture is chromatographed on a DEAE sephadex column (40 × 25 cm.) (bicarbonate form) by elution with a linear gradient of triethylammonium bicarbonate (2 liters of 0.005M to 2 liters of 0.15M). The appropriate fractions are pooled and evaporated to dryness giving the triethylammonium salt of 9-(6-deoxy-β-D-allofuranosyl)-N⁶ butyryladenine 3′,5′-cyclicphosphate, which is converted to the calcium salt and/or the sodium salt by procedures as those described in Example 25.

EXAMPLE 28

The triethylammonium salt of 9-(2-O-acetyl-6-deoxy-β-D-allofuranosyl)-hypoxanthine 3′,5′-cyclicphosphate (1 mmole) is thoroughly dried by repeated evaporation in vacuo of a solution in dry pyridine and is heated under reflux for 3 minutes with 4 ml. of phosphoryl chloride and 0.4 ml. of N,N-diethylaniline. The mixture is then evaporated in vacuo and the residue is dissolved in 5 ml. dioxane and poured into 30 g. of ice and 5 g. sodium bicarbonate. This solution is stirred at 20°C for 2 hours, with the occasional addition of sodium bicarbonate in order to maintain the pH at about 7. The mixture is extracted with chloroform (3 × 20 ml. portions), the pH of the aqueous solution is adjusted to 2 and the solution is desalted on a column of 15 g. of activated charcoal. Elution of the column is accomplished with ethanol-water-triethylamine (50:50:4) giving after evaporation in vacuo the triethylammonium salt of 6-chloro-9-(6-deoxy-β-D-allofuranosyl)-purine 3′,5′-cyclicphosphate. This material, is desired, may be purified by chromatography on a DEAE sephadex column (bicarbonate form) which is eluted with a linear gradient of triethylammonium bicarbonate.

EXAMPLE 29

The triethylammonium salt of 6-chloro-9-(6-deoxy-β-D-allofuranosyl)-purine 3′,5′-cyclicphosphate (1 mmole) is stirred at 20°C for 16 hours with 200 mg. of sodium hydrosulfide and 10 ml. ethanol. After acidification with acetic acid, the solution is evaporated in vacuo, and residue is dissolved in a small volume of water and passed through a Dowex 50 (triethylammonium form) column (30 ml.). The ultraviolet absorbing eluate is evaporated in vacuo and the residue if chromatographed on a silica gel column (25 g.) packed in chloroform. After washing the column with 250 ml. of chloroform and 250 ml. of chloroform-methanol (9:1, v/v), the product is eluted with chloroform-methanol (4:1, v/v). The solvent is evaporated in vacuo, the residue is dissolved in 4 ml. of ethanol and brought to pH 2 by the cautious addition of concentrated hydrochloric acid. The crystals are collected, washed with ethanol and dried in vacuo giving 9-(6-deoxy-β-D-allofuranosyl)-6-mercaptopurine 3′,5′-cyclicphosphate. The corresponding alkylthio and aralkylthio compounds are prepared as described in Example 18 or as follows:

EXAMPLE 30

A solution of 9-(6-deoxy-β-D-allofuranosyl)-6-mercaptopurine 3′,5′-cyclicphosphate (2 mmoles) and sodium carbonate hydrate (500 mg.) in 2 ml. of water is diluted with 8 ml. of methanol and 1.5 ml. of methyl iodide. The resultant mixture is stirred at 20°C for 1 hour, evaporated to a small volume and then applied to a Dowex 50 × 8 (H⁺) column (60 ml.). The column is eluted with water, the appropriate fractions are pooled and evaporated in vacuo in the residue is crystallized from aqueous ethanol giving 9-(6-deoxy-β-D-allofuranosyl)-6-methylthiopurine 3′,5′-cyclicphosphate.

In like manner, the corresponding 6-alkylthio and 6-arylthio and 6-aralkylthio compounds are prepared using an alternative alkyl, aryl, or aralkyl iodide, e.g., 9-(6-deoxy-β-D-allofuranosyl)-6-phenylthio 3′,5′-cyclicphosphate, 9-(6-deoxy-β-D-allofuranosyl)-6-benzylthio 3′,5′-cyclicphosphate, 9-(6-deoxy-β-D-allofuranosyl)-6-biphenylthio 3′,5′-cyclicphosphate, and 9-(6-deoxy-β-D-allofuranosyl)-6-(p-methylthiophenylthio) 3′,5′-cyclicphosphate.

EXAMPLE 31

A solution of the triethylammonium salt of 6-chloro-9-(6-deoxy-β-D-allofuranosyl)-purine 3′,5′-cyclicphosphate (2 mmoles) in 3 ml. of monoethylamine and 10 ml. of ethanol was stirred at 20° for 16 hours. The solvent is evaporated in vacuo and the residue is chromatographed on a column of silica gel (20 g.), in the same manner as described in Example 29, giving 6-ethylamino-9-(6-deoxy-β-D-allofuranosyl)-purine 3′,5′5′-cyclicphosphate.

In like manner, the corresponding 6-alkylamino, -aralkylamino, -dialkylamino, and -diaralkylamino products are prepared by employing an alternate amine in lieu of monomethylamine.

EXAMPLE 32

The procedure of Example 20 and 24 are repeated on the product of Example 28 to give the corresponding 6-alkoxy, 6-aryloxy, 6-aralkoxy, and 6-hydroxy products.

The various cyclic and acyclic phosphates described above can be isolated in the form of a salt such as a barium salt, e.g., the barium salt of 5′,5′5′-di-C-methyladenosine 3′,5′-cyclicphosphate.

What is claimed is:

1. A compound selected from those represented by the formula:

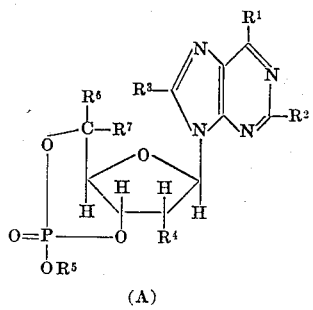

(A)

wherein
- $R^1$ is chloro, amino, acylamino, alkylamino, aralkylamino, dialkylamino, diaralkylamino, sulfhydral, alkylthio, arylthio, aralkylthio, hydroxy, alkoxy, aryloxy, or aralkoxy in which the acyl radical contains 1 to 22 carbon atoms, each alkyl radical contains 1 to 18 carbon atoms, and each aralkyl radical contains 7 to 20 carbon atoms;
- $R^2$ is hydrogen or amino;
- $R^3$ is hydrogen, halo, hydroxy, alkoxy, aryloxy, aralkoxy, sulfhydryl, alkylthio, arylthio, aralkylthio, azido, amino, acylamino, alkylamino, aralkylamino, dialkylamino, or diaralkylamino in which the acyl radical contains 1 to 22 carbon atoms, each alkyl radical contains 1 to 18 carbon atoms, and each aralkyl radical contains 7 to 20 carbon atoms;
- $R^4$ is hydroxy, an acyloxy radical having from 1 to 22 carbon atoms, tetrahydropyran-2-yloxy, tetrahydrofuran-2-yloxy or 4-(lower)-alkoxytetrahydropyran-4-yloxy;
- $R^5$ is hydrogen or a pharmaceutically acceptable cation; and
- One of $R^6$ and $R^7$ is hydrogen and the other of $R^6$ and $R^7$ is a lower alkyl group or $R^6$ and $R^7$ are identical lower alkyl groups.

2. A compound according to claim 1 wherein $R^1$ is amino or acylamino.

3. A compound according to claim 2 wherein each of $R^2$ and $R^3$ is hydrogen and $R^4$ is hydroxy.

4. A compound according to claim 3 wherein $R^6$ is hydrogen and $R^7$ is lower alkyl.

5. A compound according to claim 3 wherein $R^6$ is lower alkyl and $R^7$ is hydrogen.

6. A compound according to claim 3 wherein each of $R^6$ and $R^7$ is lower alkyl.

7. A compound according to claim 3 wherein $R^1$ is amino and $R^5$ is hydrogen.

8. A compound according to claim 7 wherein $R^6$ is hydrogen and $R^7$ is methyl.

9. A compound according to claim 7 wherein $R^6$ is methyl and $R^7$ is hydrogen.

10. A compound according to claim 7 wherein each of $R^6$ and $R^7$ is methyl.

11. A compound according to claim 1 wherein $R^1$ is butyrlamino; each of $R^2$, $R^3$ and $R^5$ is hydrogen; $R^4$ is butyryloxy; $R^6$ is methyl; and $R^7$ is hydrogen.

12. A compound according to claim 1 wherein $R^1$ is butyrlamino; each of $R^2$, $R^3$ and $R^5$ is hydrogen; $R^4$ is butyryloxy; $R^6$ is hydrogen; and $R^7$ is methyl.

13. A compound according to claim 1 wherein $R^1$ is butyrlamino; each of $R^2$, $R^3$ and $R^5$ is hydrogen; $R^4$ is butyryloxy; and each of $R^6$ and $R^7$ is methyl.

14. A compound according to claim 1 wherein $R^1$ is amino; each of $R^2$ and $R^5$ is hydrogen; $R^3$ is methylthio; $R^4$ is hydroxy; $R^6$ is hydrogen; and $R^7$ is methyl.

15. A compound according to claim 1 wherein $R^1$ is amino; each of $R^2$ and $R^5$ is hydrogen; $R^3$ is methylthio; $R^4$ is hydroxy; $R^6$ is methyl; and $R^7$ is hydrogen.

16. A compound according to claim 1 wherein $R^1$ is amino; each of $R^2$ and $R^5$ is hydrogen; $R^3$ is methylthio; $R^4$ is hydroxy; and each of $R^6$ and $R^7$ is methyl.

17. A compound according to claim 1 wherein each of $R^1$ and $R^4$ is hydroxy; $R^2$ is amino; and each of $R^3$ and $R^5$ is hydrogen.

18. A compound according to claim 17 wherein $R^6$ is hydrogen and $R^7$ is methyl.

19. A compound according to claim 17 wherein $R^6$ is methyl and $R^7$ is hydrogen.

20. A compound according to claim 17 wherein each of $R^6$ and $R^7$ is methyl.

* * * * *